Figure 1:
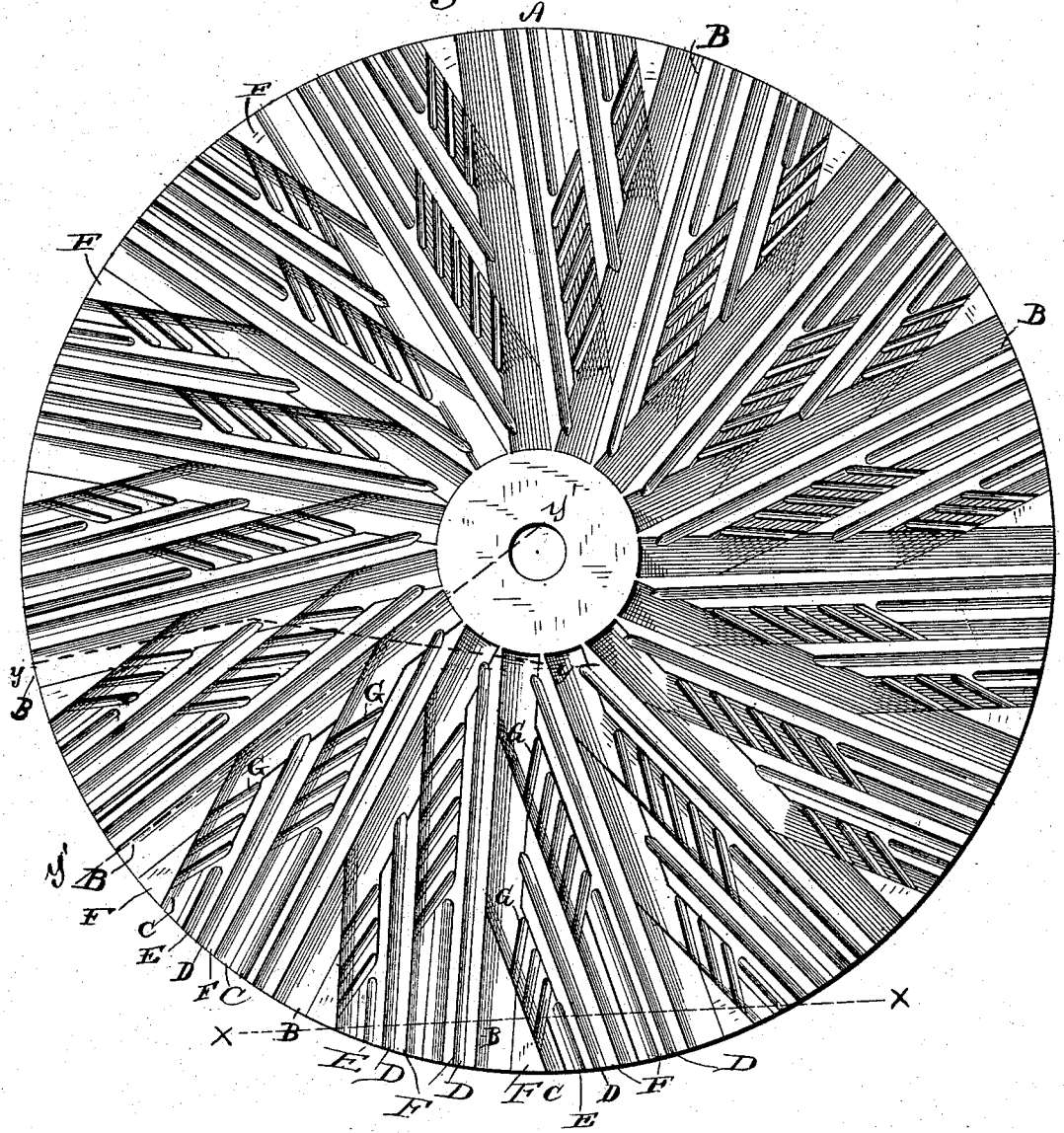

(No Model.) 2 Sheets—Sheet 1.

D. D. BROOKS.
MILLSTONE DRESS.

No. 284,535. Patented Sept. 4, 1883.

WITNESSES
F. L. Ourand.
Chas. H. Larrabee

David Drayton Brooks.
INVENTOR,

H. J. Ennis
ATTORNEY (No Model.)
2 Sheets—Sheet 2.
D. D. BROOKS.
MILLSTONE DRESS.
No. 284,535.  Patented Sept. 4, 1883.
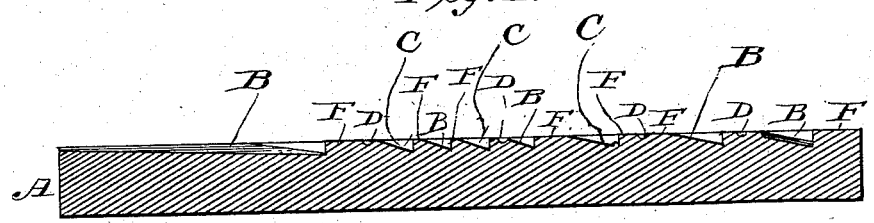
Fig. 1.ᵃ
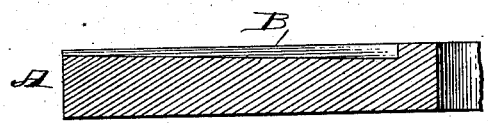
Fig. 2.
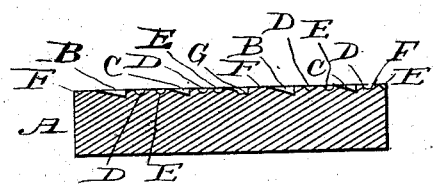
Fig. 3.
Attest:
C. Baker
Chas. F. Larrabee
David Drayton Brooks
Inventor
H. J. Ennis
Atty

United States Patent Office.

DAVID D. BROOKS, OF WASHINGTON, EDGEFIELD COUNTY, SOUTH CAROLINA.

MILLSTONE-DRESS.

SPECIFICATION forming part of Letters Patent No. 284,535, dated September 4, 1883.

Application filed March 26, 1883. (No model.)

*To all whom it may concern:*

Be it known that I, DAVID DRAYTON BROOKS, a citizen of the United States, residing at Washington township, in the county of Edgefield and State of South Carolina, have invented certain new and useful Improvements in Millstone-Dresses, of which the following is a specification, reference being had therein to the accompanying drawings.

This invention relates to certain new and useful improvements in millstone-dresses; and it has for its objects the production of a dress by which I am enabled to increase the capacity of the burrs, produce but little heating of the material, decrease the comminuting and bolting of the husk or bran, and thus preserve the glutinous and nitrogenous properties of the grain, and at the same time produce a dress which will require but little labor to keep it in order.

With these ends in view my invention consists in the novel form of dress hereinafter more fully described, and pointed out in the claim.

In the accompanying drawings, forming a part of this specification, and on which like letters of reference indicate corresponding parts, Figure 1 represents a plan view of a stone or burr having my improved dress formed thereon; Fig. 1ª, a sectional view taken on the line $y\ y$ of Fig. 1; Fig. 2, a sectional view taken on the line $y'\ y'$ of Fig. 1, showing the gradually increasing depths of the main furrows as they extend toward the center or eye of the stone; and Fig. 3, a sectional view on the line $x\ x$ of Fig. 1.

In the drawings, A represents the stone or burr; B, the main radial bevel-furrows, and C the tangential furrows, connecting with the main furrows. The furrows B and C gradually increase in depth from the circumference toward the center or eye of the stone or burr. The surface of the stone, between the main and the tangential furrows B and C, is provided with long and short tangential grooves D and E, of less width than the furrows B and C, leaving the intermediate lands, F, between the furrows D and E. The furrows C, tangential to the main furrows B and intermediate the short grooves E and the furrows B, are provided with tangential parallel drift-grooves G, of equal length.

By having the main furrows B and the tangential furrows C increasing in depth from the circumference toward the center or eye of the stone the feed is greatly increased, while by the grooves D and E and the drift-grooves G the feed is well and equally distributed over the whole surface between the stones, thus preventing their choking, and causing but little comminution of the husk or bran, and the grain reduced will need but little bolting, and the quality of the flour or meal will be improved. The arrangement of the furrows and the lands as above stated also causes increased draft and a more free circulation of air, thereby obviating to a great extent the heating of the material.

Having thus fully described my invention, what I claim as new, and desire to secure by Letters Patent, is—

A millstone-dress having the main bevel-furrows B and the tangential furrows C, increasing in depth from the circumference toward the center or eye of the stone, the tangential long and short grooves D and E, the lands F, and the tangential parallel drift-grooves G, extending across the furrows C, as and for the purpose herein shown and described.

In testimony whereof I affix my signature in presence of two witnesses.

DAVID DRAYTON BROOKS.

Witnesses:
G. D. TILLMAN,
J. H. TILLMAN.